(12) United States Patent
Dos Santos Freire

(10) Patent No.: US 9,416,212 B1
(45) Date of Patent: Aug. 16, 2016

(54) PNEUMATIC TIRE WITH BLOCK COPOLYMER

(71) Applicant: THE GOODYEAR TIRE & RUBBER COMPANY, Akron, OH (US)

(72) Inventor: Lucas Manuel Dos Santos Freire, Pittsburgh, PA (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 14/827,834

(22) Filed: Aug. 17, 2015

(51) Int. Cl.
| | |
|---|---|
| *C08L 7/00* | (2006.01) |
| *C08F 293/00* | (2006.01) |
| *C08L 53/02* | (2006.01) |
| *C08L 47/00* | (2006.01) |
| *C08L 9/06* | (2006.01) |
| *C08L 9/00* | (2006.01) |
| *C08K 3/36* | (2006.01) |
| *C08K 3/04* | (2006.01) |

(52) U.S. Cl.
CPC ............... *C08F 293/00* (2013.01); *C08K 3/04* (2013.01); *C08K 3/36* (2013.01); *C08L 7/00* (2013.01); *C08L 9/00* (2013.01); *C08L 9/06* (2013.01); *C08L 47/00* (2013.01); *C08L 53/02* (2013.01)

(58) Field of Classification Search
CPC ........................................................ C08L 7/00
See application file for complete search history.

(56) References Cited

U.S. PATENT DOCUMENTS

| 3,663,634 A | 5/1972 | Morton et al. |
| 5,134,199 A * | 7/1992 | Hattori .................. C08F 297/04 525/250 |
| 6,197,889 B1 * | 3/2001 | Knoll .................... C08F 297/04 525/314 |
| 6,476,131 B1 | 11/2002 | Hamed et al. |
| 7,230,050 B2 | 6/2007 | Robertson et al. |
| 7,342,064 B2 | 3/2008 | Hochi |

OTHER PUBLICATIONS

Yuki, et al. Anionic Copolymerization of Styrene and 1,1-Diphenylethylene, Bulletin of the Chemical Society of Japan, vol. 40, p. 2659-2663 (1967).
Knoll, et al. A Forgotten Class of High Tg Thermoplastic Materials: Anionic Copolymers of Styrene and 1,1-Diphenylethylene, Ionic Polymerization and Related Processes, J. Puskas et al (eds.), Kluwer Academic Publishers, p. 219-221 (1999).
Gausepohl, et al. Super-Polystyrene: a New Class of Engineering Plastics with Versatile Properties, Designed Monomer and Polymers, vol. 3, No. 3, p. 299-315 (2000).
Quirk, et al. Adducts of Polymeric Organolithiums with 1,1-Diphenylethylene. Rates of Formation and Crossover to Styrene and Diene Monomers, Macromolecular Chemistry and Physics, vol. 204, p. 1719-1737 (2003).

* cited by examiner

*Primary Examiner* — Robert Harlan
(74) *Attorney, Agent, or Firm* — John D. DeLong

(57) ABSTRACT

The present invention is directed to a pneumatic tire comprising a rubber composition, the rubber composition comprising a polybutadiene-b-(poly(styrene-co-diphenylethylene)) block copolymer.

11 Claims, 4 Drawing Sheets

PNEUMATIC TIRE WITH BLOCK COPOLYMER

BACKGROUND

There is interest in utilizing synthetic polymer particles as reinforcement in tire rubber compounds in place of traditional fillers, such as carbon black and silica. Such synthetic fillers may include nylon, polyaramid, syndiotactic polybutadiene, and various block copolymers. There are at least two problems generic to all of these approaches. First, the $T_g$ of the reinforcing polymer particles has to be high enough so that the particles do not soften at the operating temperature of the tires ($T_g$>110-120° C.). At the same time, the melting temperature should be low enough so the particles melt during mixing ($T_m$<170° C.), or the particles be made of small enough particle size. Second, the cost of most of these reinforcing materials is too high.

1,1-Diphenylethylene (DPE) is a monomer that does not homopolymerize due to steric hindrance from the two aromatic rings, but that can copolymerize with styrene by anionic polymerization in an almost ideal fashion (see e.g., Yuki et. al., *B. Chem. Soc. Jpn.* 1967, 40, 2659-2663; Xu et al., *Macromolecules* 2003, 36, 5432-5434.)

The copolymer $T_g$ accordingly can be varied between 100° C. (100% polystyrene) and about 168° C. (50 mol % DPE). The copolymerization of DPE with other monomers, such as butadiene and isoprene, by anionic polymerization has also been studied (Quirk et al., *Macromol. Chem. Phys.* 2003, 204, 1719-1737.) Block copolymers, with a soft segment (PBd) and a hard segment (PS-co-DPE) were also synthesized (Knoll et al., Ionic Polymerizations and Related Processes. Puskas et al., ed., Kluwer Academic Publishers, Netherlands, 1999, p 219-221; Gausepohl et. al. *Des. Monomers Polym.* 2000, 3(3), 299-315.) Nevertheless, the previous work was directed towards making an improved styrene copolymer, for applications in HIPS, ABS, etc. Use of such a copolymer in tires is unknown.

SUMMARY

It has now been found that a block copolymer of PBd-b-(PS-co-DPE) may be synthesized; the resulting copolymer has a $T_g$ about 150° C. and remains hard enough to act as a tire rubber compound reinforcement at the maximum operating temperature of a tire 100-120° C.

The present invention is therefore directed to a pneumatic tire comprising a rubber composition, the rubber composition comprising a polybutadiene-b-(poly(styrene-co-diphenylethylene)) block copolymer.

DESCRIPTION

Figure 1:
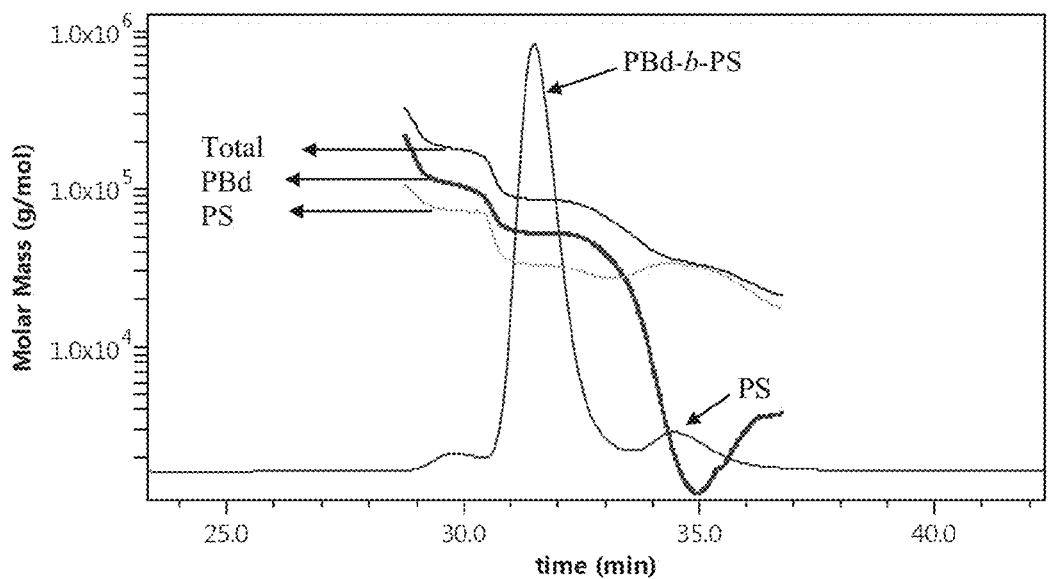
FIG. 1 shows a GPC traces of a PBd-b-PS control sample.

There is disclosed a pneumatic tire comprising a rubber composition, the rubber composition comprising a polybutadiene-b-(poly(styrene-co-diphenylethylene)) block copolymer.

The block copolymer can be made utilizing monofunctional initiators having the general structural formula P-M, wherein P represents an alkyl group and wherein M represents a metal of group I or II.

The initiator used to initiate the polymerization employed in synthesizing the block copolymer is typically selected from the group consisting of barium, lithium, magnesium, sodium, and potassium. Lithium and potassium are the metals that are most commonly utilized in the synthesis of such metal terminated polymers (living polymers). Normally, lithium initiators are more preferred.

Organolithium compounds are the preferred initiators for utilization in such polymerizations. The organolithium compounds which are utilized as initiators are normally organo monolithium compounds. The organolithium compounds which are preferred as initiators are monofunctional compounds which can be represented by the formula: R—Li, wherein R represents a hydrocarbyl radical containing from 1 to about 20 carbon atoms. Generally, such monofunctional organolithium compounds will contain from 1 to about 10 carbon atoms. Some representative examples of preferred initiators include n-butyllithium, sec-butyllithium, n-hexyllithium, n-octyllithium, tertoctyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, and 4-cyclohexylbutyllithium. Secondary-butyllithium is a highly preferred organolithium initiator.

The amount of organolithium initiator utilized will vary depending upon the molecular weight which is desired for the rubbery polymer being synthesized as well as the precise polymerization temperature which will be employed. The precise amount of organolithium compound required to produce a polymer of a desired molecular weight can be easily ascertained by persons skilled in the art. However, as a general rule from 0.01 to 1 phm (parts per 100 parts by weight of monomer) of an organolithium initiator will be utilized. In most cases, from 0.01 to 0.1 phm of an organolithium initiator will be utilized with it being preferred to utilize 0.025 to 0.07 phm of the organolithium initiator.

In one embodiment, the block copolymer has the structure polyA-b-(poly(B-co-C) where A is a residue of a conjugated diene monomer, B is a residue of a vinyl aromatic monomer, and C is a residue of a substituted or unsubstituted diphenylethylene.

In one embodiment, the monomers used to synthesize the block copolymer include a conjugated diene monomer, a vinyl aromatic monomer, and a substituted or unsubstituted diphenylethylene.

Suitable conjugated diene monomers include 1,3-butadiene, isoprene, 1,3-pentadiene, 2,3-dimethyl-1,3-butadiene, 2-methyl-1,3-pentadiene, 2,3-dimethyl-1,3-pentadiene, 2-phenyl-1,3-butadiene, and 4,5-diethyl-1,3-octadiene, and the like.

Suitable vinyl aromatic monomers include styrene, 1-vinylnaphthalene, 3-methylstyrene, 3,5-diethylstyrene, 4-propylstyrene, 2,4,6-trimethylstyrene, 4-dodecylstyrene, 3-methyl-5-normal-hexylstyrene, 4-phenylstyrene, 2-ethyl-4- benzylstyrene, 3,5-diphenylstyrene, 2,3,4,5-tetraethylstyrene, 3-ethyl-1-vinylnapthalene, 6-isopropyl-1-vinylnapthalene, 6-cyclohexyl-1-vinylnapthalene, 7-dodecyl-2-vinylnapthalene, α-methylstyrene, and the like.

Suitable substituted 1,1-diphenylethylenes include 1,1-diphenylethylene with at least one of its aromatic rings substituted with at least one alkyl group having from 1 to 8 carbon atoms.

In one embodiment, the monomers used to synthesize the block copolymer include 1,3-butadiene, styrene and 1,1-diphenylethylene (DPE). In one embodiment, the block copolymer PBd-b-(PS-co-DPE) includes from 60 to 80 percent by weight of a polybutadiene (PBd) block, and from 20 to 40 percent by weight of a styrene-diphenylethylene (PS-co-DPE) block. In one embodiment, the block copolymer includes from 65 to 75 percent by weight of a polybutadiene block, and 25 to 35 percent by weight of a styrene-diphenylethylene block. The styrene-diphenylethylene block may include from 95 to 36 percent by weight of styrene, and from 5 to 64 percent by weight of diphenylethylene, based on the weight of styrene-diphenylethylene block. In one embodiment, the styrene-diphenylethylene block comprises from 5 to 50 percent by weight of diphenylethylene, based on the weight of the styrene-diphenylethylene block.

The PBd-b-(PS-co-DPE) will exhibit two glass transition temperatures in a DSC trace, one corresponding to the polybutadiene block and one corresponding to the styrene-diphenylethylene block. The Tg of the polybutadiene block with be in a range typical from polybutadiene, generally from −85 to −105° C. The Tg of the styrene-diphenylethylene block will depend on the percentage of diphenylethylene in the styrene-diphenylethylene block, this Tg will range from near the Tg of polystyrene (about 100° C.) up to about 170° C. In one embodiment, the Tg corresponding to the styrene-diphenylethylene block ranges from 120 to 160° C. In one embodiment, the Tg corresponding to the styrene-diphenylethylene block is greater than 120° C. In one embodiment, the Tg corresponding to the styrene-diphenylethylene block is greater than 130° C. In one embodiment, the Tg corresponding to the styrene-diphenylethylene block is greater than 140° C. Glass transition temperature may be measured for example by DSC inflection with a 10-20° C./min heating rate.

The block copolymers are generally prepared by solution polymerizations that utilize inert organic solvents, such as saturated aliphatic hydrocarbons, aromatic hydrocarbons, or ethers. The solvents used in such solution polymerizations will normally contain from about 4 to about 10 carbon atoms per molecule and will be liquids under the conditions of the polymerization. Some representative examples of suitable organic solvents include pentane, isooctane, cyclohexane, normal-hexane, benzene, toluene, xylene, ethylbenzene, tetrahydrofuran, and the like, alone or in admixture. For instance, the solvent can be a mixture of different hexane isomers. Such solution polymerizations result in the formation of a polymer cement (a highly viscous solution of the polymer).

The block copolymer synthesized can be produced using either a batch or continuous anionic polymerization process. The polymerization medium can include modifiers like tetramethylethylenediamine (TMEDA), sodium mentholate (SMT), ditetrahydrofurfurylpropane (DTP), tetrahydrofuran (THF), polyethers or their combinations. Branching agents, for example divinylbenzene, silicon tetrachloride etc, can also be used during polymerization.

After the polymerization reaction is completed, it will normally be desirable to "kill" any living polydiene chains which remain. This can be accomplished by adding water, an organic acid, or an alcohol, such as methanol or ethanol, to the polymer cement after the functionalization reaction is completed in order to eliminate any living polymer. The block copolymer can then be recovered from the solution utilizing standard techniques.

The block copolymer may be compounded into a rubber composition. The rubber composition may include elastomers comprising the block copolymer alone, or may include the block copolymer along with additional elastomers as described below. Generally, in a composition including the block copolymer and additional elastomers, the rubber composition may include from 95 to 5 phr of the block copolymer, and optionally from 5 to 95 phr of additional elastomers.

The rubber composition may optionally include, in addition to the functionalized polymer, one or more rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis 1,4 polybutadiene), polyisoprene (including cis 1,4 polyisoprene), butyl rubber, halobutyl rubber such as chlorobutyl rubber or bromobutyl rubber, styrene/isoprene/butadiene rubber, copolymers of 1,3 butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the at least one additional rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E SBR having a medium to relatively high bound styrene content, namely, a bound styrene content of about 30 to about 45 percent.

By emulsion polymerization prepared E-SBR, it is meant that styrene and 1,3 butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom.

The rubber composition may include silica, carbon black, or a combination of silica and carbon black.

The rubber composition may include from about 1 to about 150 phr of silica. In another embodiment, from 10 to 100 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the Journal of the American Chemical Society, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc. Silica pretreated or prereacted with organosilanes may also be used, such as Agilon 400 and the like from PPG.

Commonly employed carbon blacks can be used as a conventional filler in combination with silica in an amount ranging from 1 to 150 phr. In another embodiment, from 10 to 100 phr of carbon black may be used. Although carbon black may be used with silica, in one embodiment, essentially no carbon black is used except for an amount required to impart black color to the tire which is from 1 to 10 phr. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm3/100 g.

Combinations of silica and carbon black may be used in the composition. In one embodiment, the weight ratio of silica to carbon black is greater than or equal to one.

Other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl)disulfide and/or 3,3'-bis(triethoxysilylpropyl)tetrasulfide.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)—S—CH_2CH_2CH_2Si(OCH_2CH_3)_3$, which is available commercially as NXT from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature (s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

This invention is illustrated by the following examples that are merely for the purpose of illustration and are not to be regarded as limiting the scope of the invention or the manner in which it can be practiced. Unless specifically indicated otherwise, parts and percentages are given by weight.

Example 1

In this example, the synthesis of a polybutadiene-b-(poly (styrene-co-diphenylethylene)) block copolymer is illustrated.

A 15% monomer in cyclohexane premix was used to make the styrene cement. The styrene premix was made in a 5-gallon tank. The premix was dried over molecular sieves and silica-gel in a drying column for 24 hours. Similarly, a 50% butadiene in cyclohexane premix was made in a 1-gallon tank. The butadiene premix was dried over molecular sieves in a half-gallon bottle for 24 hours. Both premixes were titrated with 0.12M n-butyl lithium (nBuLi, Aldrich) in a glovebox to determine moisture concentration.

A 15% 1,1-diphenylethylene (DPE, Aldrich, 98%) in cyclohexane was prepared in an 8 oz bottle and dried over molecular sieves for 24 hours.

Polymerizations were performed in 4 oz bottles. First, the styrene premix and DPE premix were placed in the bottles in the glovebox. Polymerizations were started by addition of 0.12M nBuLi solution, with a target molecular weight of 30,000 g/mol. The bottles were placed in a 65° C. water bath for 6 hours. Samples were removed from the bath and placed in the glovebox where the butadiene cement was transferred via cannula into the cement. Before adding the butadiene, an amount of butadiene cement slightly larger than the necessary was placed in a 4 oz bottle, and nBuLi was added to it until a slight color was observed to eliminate moisture. Also, an aliquot of cement was taken out of the polymerization bottle for analysis of the PS-co-DPE block and to make space in the bottle for the butadiene cement. The amount of butadiene added was calculated so the final polymer would have a 30% styrene content. The bottles were returned to the water bath for an additional hour. The samples were stabilized with BHT in isopropanol and pan-dried in a vacuum-oven for 24 hours.

Example 2

In this example, analysis of the copolymers of Example 1 is given.

The glass transition temperature ($T_g$) was determined by DSC at 20° C./min heating rate. Molecular weight and molecular weight distribution were determined by GPC. Styrene content was also determined by GPC. The ARES G2 was used to perform small amplitude oscillatory shear (SAOS) on the samples. To prepare the polymers for testing with the ARES, 25 mm disks, 1.0 mm thick were molded using a Carver press and a custom mold. Samples were pressed for 30 minutes at a temperature 30° C. above the melting point of the hard block. SAOS was carried out at 30° C. with frequencies ranging from 100 rad/s to $10^{-2}$ rad/s at a strain of 1%. Temperature sweeps were performed at 1% strain and a frequency of 1 rad/s.

GPC Results

Molecular weights were determined by GPC and calculated using a method available in the ASTRA software which allows to use the dn/dc and UV extinction coefficient of two components, and determines the concentration of each component. To use this method, first, a pure polystyrene sample was run. When a sample is injected in the GPC system, the sample concentration can be determined from either the RI detector (knowing the dn/dc of the sample) or the UV detector (knowing the UV extinction coefficient of the sample). In this case, to determine the UV extinction coefficient of polystyrene, a polystyrene sample was injected in the GPC and the sample concentration was determined from the RI detector, using dn/dc=0.185). Then, knowing the concentration calculated from the RI detector, and the integration of the UV signal, the UV absorption coefficient can be calculated. It was determined that the UV extinction coefficient of PS is 1.41 for the system. PBd does not absorb UV light and the UV extinction coefficient was corroborated to be 0. Dn/dc values of 0.120 and 0.185 were used for polybutadiene and polystyrene respectively.

To determine the copolymer composition, basically, what the GPC software does is to calculate the polystyrene concentration from the UV detector, and then subtracts this concentration to the total concentration determined from the RI detector.

The GPC traces of a PBd-b-PS control sample can be seen in FIG. 1. GPC data is summarized in Table 1. The total molar mass, polystyrene segment molar mass, and polybutadiene segment molar mass can be seen in FIG. 1. It is observed, at 35 min. elution time, that the polymer has 9% of homo-polystyrene with 34 kg/mol. At 32 min. elution time, it can be seen that the sample has 91% of PBd-b-PS with 86 kg/mol. It can be seen here that the PS segment has 34 kg/mol and the PBd segment has 52 kg/mol. Overall, the sample contains 35% PS and 65% PBd

TABLE 1

|  | PBd-b-PS | | PBd-b-(PS-co-DPE) | |
| --- | --- | --- | --- | --- |
|  | Peak 1 | Peak 2 | Peak 1 | Peak 2 |
| Mass fraction (%) | 9 | 91 | 21 | 79 |
| Styrene content (%) | 100 | 29 | 100 | 11 |
| $M_n$ (g/mol) | 34,400 | 86,100 | 24,500 | 215,900 |
| $M_w$ (g/mol) | 35,300 | 88,700 | 25,500 | 245,000 |
| $M_w/M_n$ | 1.03 | 1.03 | 1.04 | 1.14 |

Figure 2:
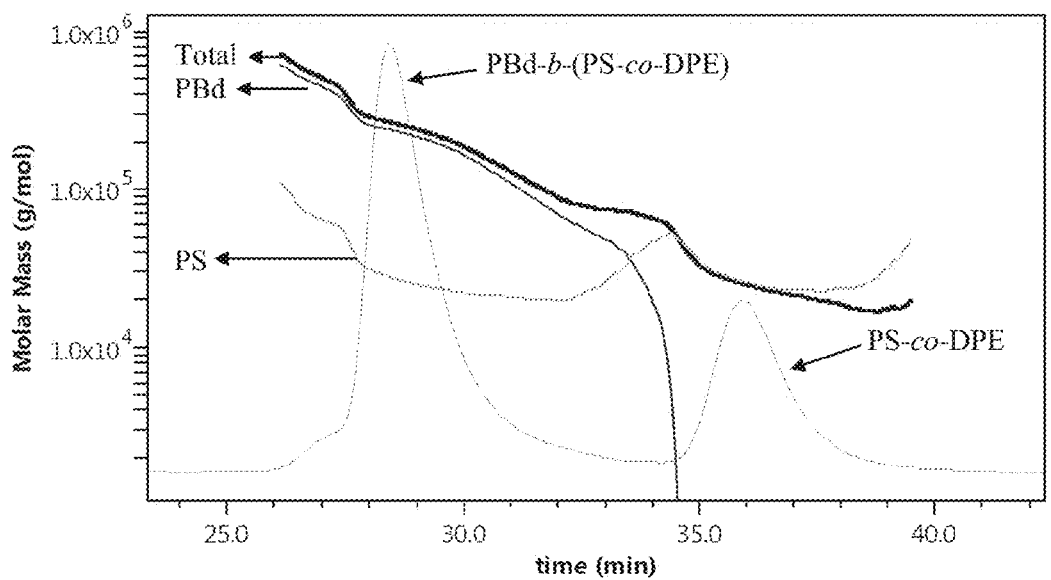
FIG. 2 shows a GPC traces of a PBd-b-(PS-co-DPE) sample.

The GPC traces of a PBd-b-(PS-co-DPE) sample can be seen in FIG. 2. It is observed, at 36 min. elution time, that the polymer has 21% of homo-polystyrene with 25 kg/mol. At 28 min. elution time, it can be seen that the sample has 79% of PBd-b-(PS-co-DPE) with 215 kg/mol. It can be seen here that the PS segment has 25 kg/mol and the PBd segment has 190 kg/mol. Overall the sample has 30% PS-DPE and 70% PBd. It is observed that the crossover from PS to PBd during the polymerization was not as efficient (79%) as in the control sample (91%). The consequences of this are that there is a large amount of PS-co-DPE (21%), without PBd, and that the PBd segment has a larger molecular weight than the target. Nevertheless, for the goals of these experiments the sample prepared is useful and polymerization conditions can be optimized later.

DSC Results

Figure 3:
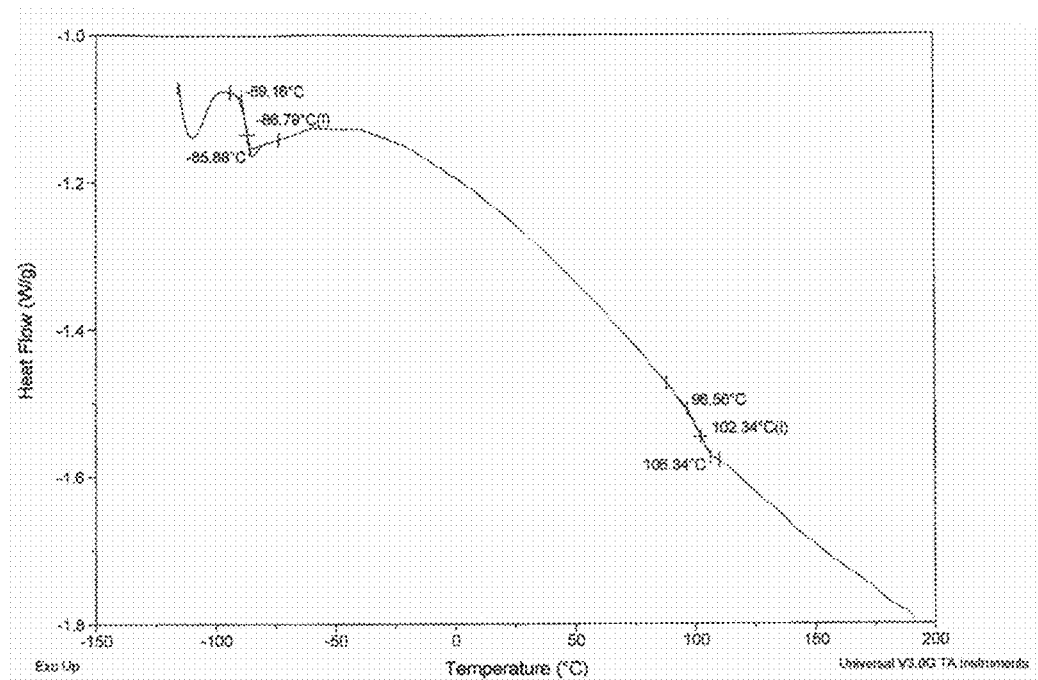
FIG. 3 shows a DSC trace for a PBd-b-PS sample.
Figure 4:
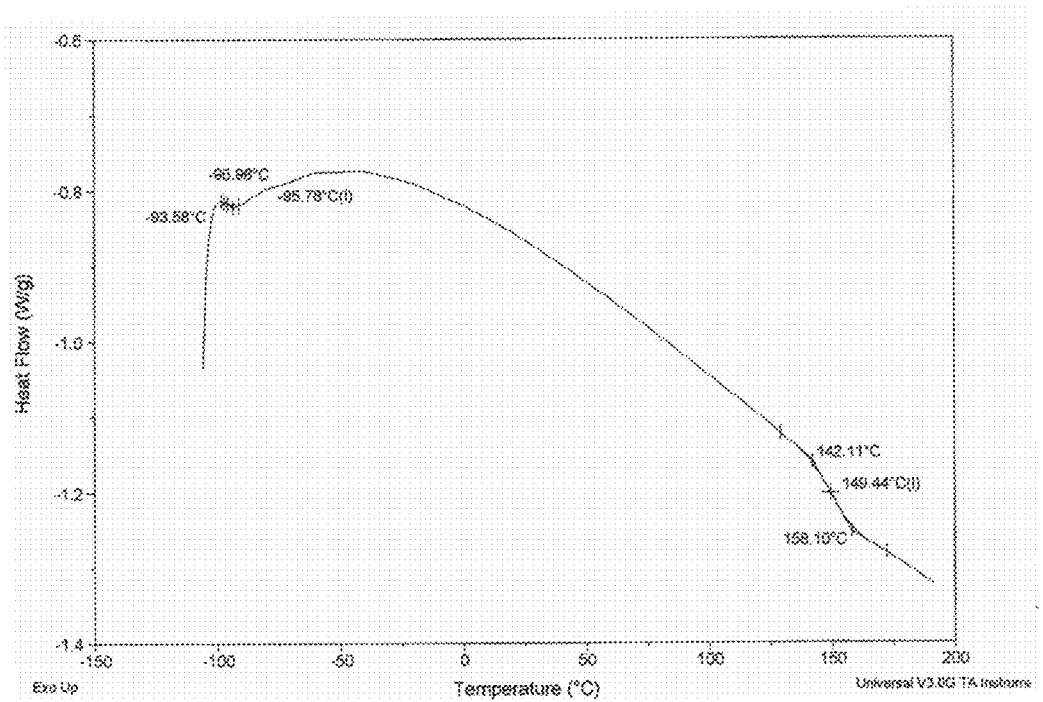
FIG. 4 shows a DSC trace for a PBd-b-(PS-co-DPE) sample.

The DSC traces of the samples described previously are shown in FIG. 3 (PBd-b-PS) and FIG. 4 (PBd-b-(PS-co-DPE)). In FIG. 3, it can be seen that the $T_g$ of the PBd segment is about −87° C., and the PS segment around 102° C. as expected. In FIG. 4, it can be seen that the $T_g$ of the hard segment increases to 149° C. This is a confirmation the DPE was successfully incorporated in the hard block.

ARES Results

Having corroborated that DPE was incorporated in the hard block and the Tg was increased, rheological characterization was performed to determine if strengthening of the material was maintained at higher temperature.

Figure 5:
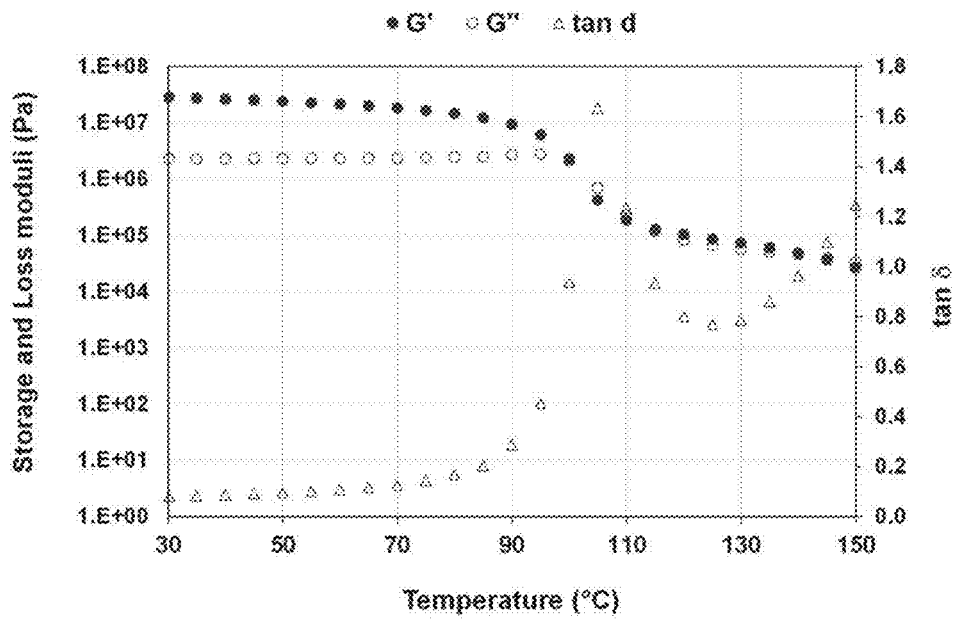
FIG. 5 shows an ARES temperature sweep for a PBd-b-PS sample.
Figure 6:
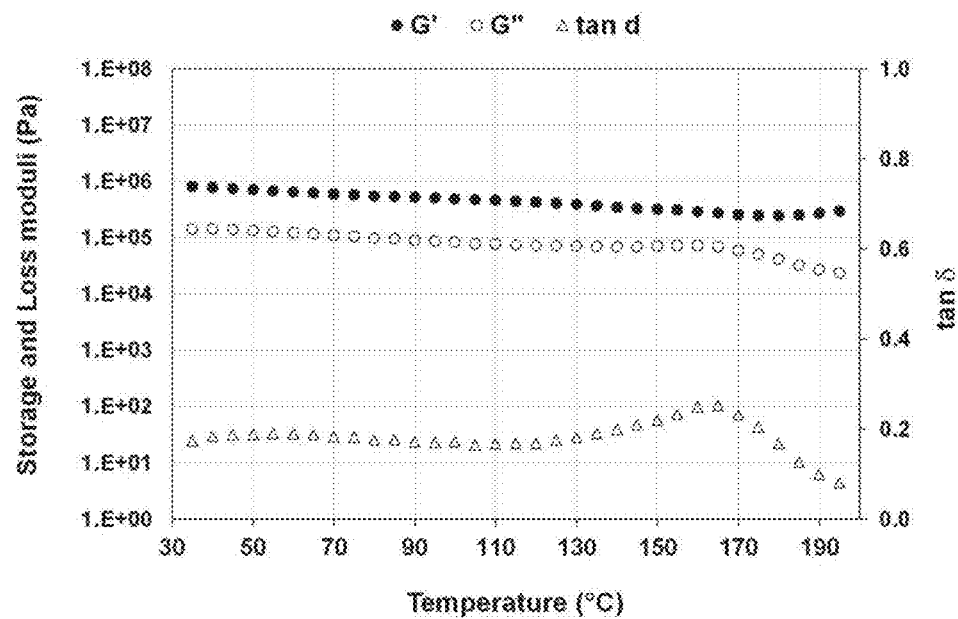
FIG. 6 shows an ARES temperature sweep for a PBd-b-(PS-co-DPE) sample.

ARES temperature sweep of the samples are shown in FIGS. 5 and 6. In FIG. 5 (PBd-b-PS), it can be seen that the sample without DPE softens between 90 and 110° C., corresponding to the polystyrene $T_g$. This is due to the melting of the hard domains and means that if this material is used for tire reinforcement, the tire would soften drastically once it heats up to this temperature. In FIG. 6 (PBd-b-(PS-co-DPE)), it can be seen that the sample containing DPE does not soften with increasing temperature. The sample is supposed to soften at around 150° C., but it does not. This might be because at this high temperature crosslinking might occur, which compensates for the softening of the hard segments. It should be noted that the sample has the typical behavior of a crosslinked rubber. A sample such as linear PBd would show a decrease in G', and a crossover between G' and G" at high temperature.

Figure 7:
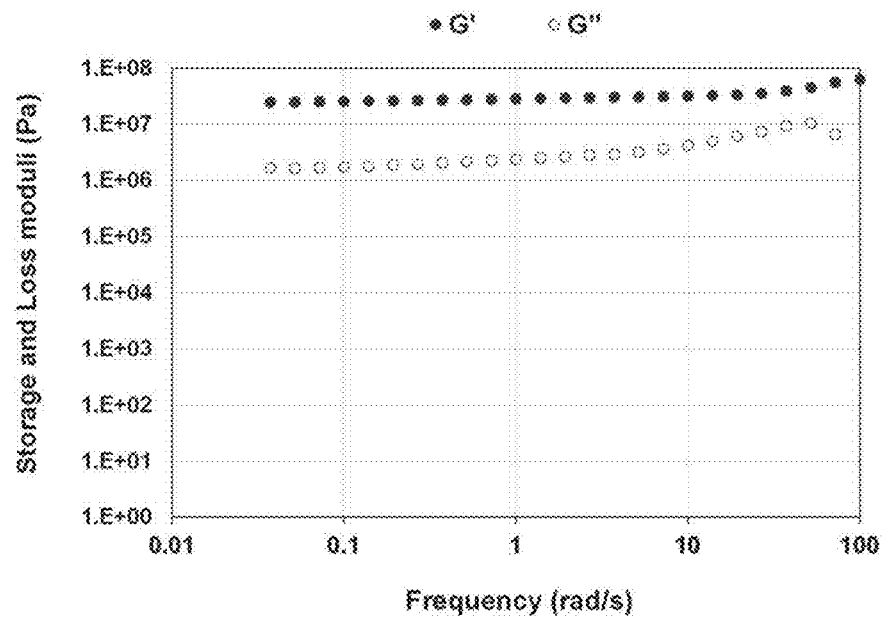
FIG. 7 shows an ARES frequency sweep at 30° C. for a PBd-b-PS sample.
Figure 8:
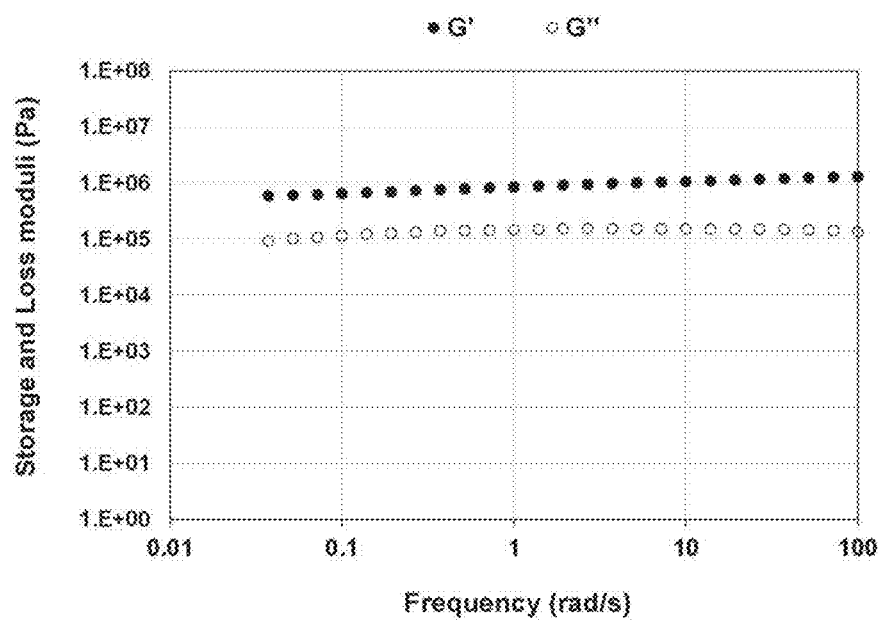
FIG. 8 shows an ARES frequency sweep at 30° C. for a PBd-b-(PS-co-DPE) sample.

ARES frequency sweeps at 30° C. are shown in FIG. 7 (PBd-b-PS), and FIG. 8 (PBd-b-(PS-co-DPE)). The relatively flat G' and G" curves indicate that the samples behave like crosslinked rubbers. Again, an uncrosslinked rubber would have a decrease in G' at low frequency and a crossover between G' and G".

A PBd-b-(PS-co-DPE) sample was successfully prepared, characterized, and its rheological properties were compared to a PBd-b-PS control. It was determined that while the hard phase of the PBd-b-PS sample has a $T_g$ at 102° C., the $T_g$ of the hard phase of the sample containing DPE is increased to 149° C. Rheological data showed that both samples behave like crosslinked rubber. In the PBd-b-PS sample, hard phases melt at around 100° C. and the sample softens. On the other side, that sample containing DPE remains reinforced up to very high temperatures, when the sample starts to degrade.

The invention claimed is:

1. A pneumatic tire comprising at least one component, the component comprising a rubber composition comprising a polybutadiene-b-(poly(styrene-co-diphenylethylene)) block copolymer; wherein the block copolymer comprising from 60 to 80 percent by weight of polybutadiene block, and from 20 to 40 percent by weight of poly(styrene-co-diphenylethylene) block, wherein the poly(styrene-co-diphenylethylene) block comprises from 5 to 64 percent by weight of diphenylethylene units based on the weight of the poly(styrene-co-diphenylethylene) block.

2. The pneumatic tire of claim 1, wherein the block copolymer has a glass transition temperature Tg for the poly(styrene-co-diphenylethylene) block greater than 120 C.

3. The pneumatic tire of claim 1, wherein the block copolymer has a glass transition temperature Tg for the poly(styrene-co-diphenylethylene) block greater than 130 C.

4. The pneumatic tire of claim 1, wherein the block copolymer has a glass transition temperature Tg for the poly(styrene-co-diphenylethylene) block greater than 140 C.

5. The pneumatic tire of claim 1, the rubber composition further comprising at least one additional diene based elastomer.

6. The pneumatic tire of claim 1, the rubber composition further comprising at least one elastomer selected from the group consisting of styrene-butadiene rubber, polybutadiene, natural rubber, and synthetic polyisoprene.

7. The pneumatic tire of claim 1, the rubber composition further comprising a filler selected from the group consisting of carbon black and silica.

8. The pneumatic tire of claim 1, where the component is selected from the group consisting of tread, sidewall, innerliner, plycoat, wirecoat, apex, chafer, and chipper.

9. The pneumatic tire of claim 1, wherein the tire is selected from the group consisting of passenger tires, truck tires, and off-road tires.

10. The pneumatic tire of claim 1, wherein the poly(styrene-co-diphenylethylene) block comprises from 5 to 50 percent by weight of diphenylethylene units based on the weight of the poly(styrene-co-diphenylethylene) block.

11. The pneumatic tire of claim 1, wherein the block copolymer comprises from 65 to 75 percent by weight of the polybutadiene block, and 25 to 35 percent by weight of the styrene-diphenylethylene block.

* * * * *